United States Patent
Schreter (10) Patent No.: US 10,122,621 B2
(45) Date of Patent: Nov. 6, 2018

(54) MODIFIED CONSENSUS PROTOCOL FOR ELIMINATING HEARTBEAT NETWORK TRAFFIC

(71) Applicant: SAP SE, Walldorf (DE)

(72) Inventor: Ivan Schreter, Malsch (DE)

(73) Assignee: SAP SE, Walldorf (DE)

(*) Notice: Subject to any disclaimer, the term of this patent is extended or adjusted under 35 U.S.C. 154(b) by 171 days.

(21) Appl. No.: 15/184,173

(22) Filed: Jun. 16, 2016

(65) Prior Publication Data

US 2017/0366451 A1  Dec. 21, 2017

(51) Int. Cl.
| | |
|---|---|
| *G06F 15/16* | (2006.01) |
| *H04L 12/703* | (2013.01) |
| *H04L 12/26* | (2006.01) |
| *H04L 29/08* | (2006.01) |
| *H04L 12/715* | (2013.01) |
| *G06F 11/18* | (2006.01) |
| *G06F 11/14* | (2006.01) |

(52) U.S. Cl.
CPC .......... *H04L 45/28* (2013.01); *H04L 43/0811* (2013.01); *H04L 43/16* (2013.01); *H04L 45/46* (2013.01); *H04L 67/10* (2013.01); *G06F 11/1425* (2013.01); *G06F 11/184* (2013.01)

(58) Field of Classification Search
CPC .......................... G06F 11/1425; G06F 11/184
See application file for complete search history.

(56) References Cited

U.S. PATENT DOCUMENTS 9,654,375 B1 * 5/2017 Pani .................. H04L 43/50
2006/0053139 A1 * 3/2006 Marzinski ........... G06F 11/1435

OTHER PUBLICATIONS

Ongaro et al., In Search of an Understandable Consensus Algorithm (Extended Version), 2014, 18 pages.*

* cited by examiner

*Primary Examiner* — Hieu Hoang
(74) *Attorney, Agent, or Firm* — Mintz Levin Cohn Ferris Glovsky and Popeo, P.C.

(57) ABSTRACT

A computing system in data communication with a plurality of nodes that make up a distributed computing cluster can detect an absence of communication from a node of the plurality of nodes over a time period that exceeds a predefined threshold time period. The computing system can query an instance of a central topology manager for the plurality of nodes regarding liveness of the node from which the absence of communication was detected and can attempting to re-initiate communication with the node when the instance of the central topology manager indicates that the node is live.

18 Claims, 4 Drawing Sheets

MODIFIED CONSENSUS PROTOCOL FOR ELIMINATING HEARTBEAT NETWORK TRAFFIC

TECHNICAL FIELD

The subject matter described herein relates to distributed computing systems, and in various aspects to communication between nodes of such systems.

BACKGROUND

Nodes of a distributed computing system communicate over a communication network. Nodes can be computing systems that each include at least one programmable processor. A distributed system can, in a non-limiting example, be a cluster of nodes that implement a distributed data storage application or any other kind of application in which exchange of messages between nodes in a cluster occurs to enable the multiple nodes to remain synchronized with regard to processes being executed by the cluster. A process as used herein refers generally to any kind of data processing, data storage, or other computer-implemented process. A communication network can include one or more of a wired network, a wireless network, a local area network, a wide area network, an organization's intranet, the Internet, or the like. Usually, nodes in a distributed system use consensus protocols to coordinate replication of data on several nodes to enable continued operation in case of a failure of one or more of the nodes of the cluster. Other nodes of a cluster besides a node being referenced are generally referred to as "peer nodes" or simply "peers" of the node.

SUMMARY

Aspects of the current subject matter can provide the ability to offer safe connection reestablishment procedure after network failures or node failures.

In one aspect, a method includes a computing system in data communication with a plurality of nodes that make up a distributed computing cluster detecting an absence of communication from a node of the plurality of nodes over a time period that exceeds a predefined threshold time period, the computing system querying an instance of a central topology manager for the plurality of nodes regarding liveness of the node from which the absence of communication was detected, and the computing system attempting to re-initiate communication with the node when the instance of the central topology manager indicates that the node is live.

In some variations one or more of the following features can optionally be included in any feasible combination. The computing system can include or be another node of the plurality of nodes, or the computing system can include or be a client machine in communication with the cluster. The re-initiating can include the computing system retrying a failed communication with the node. The re-initiating can include ceasing the communication from the master node of the cluster to a follower node of the cluster. The re-initiating can include starting a new master election process on a follower node of the plurality of nodes. The new master election process can be started at the direction of one of the follower nodes and/or by a client machine, either of which can be or be included in the computing system.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to a data storage application, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

Partial network failures and/or node failures (e.g. crashes, restarts, etc. occurring at the computing system of one or more nodes) can be a relatively common occurrence in distributed computing systems, and particularly in larger-scale distributed systems with a large number of nodes, for example in distributed applications in which continuous connections between the nodes of a cluster cannot be guaranteed and/or if one or more nodes may fail or otherwise go out of service in the course of the cluster being in productive use. In the event of a communication failure with a peer, a node generally attempts to re-establish communication with the peer. One or more of several issues can arise in such a situation. For example, detection of the communication failure can be necessary, as well as identification of whether the peer instance is still in the same state as before the communication was lost. Implementations of the current subject matter can provide a robust and efficient approach by which one or more nodes in a cluster of nodes can reestablish communication with a temporarily unavailable peer in the cluster.

Figure 1:
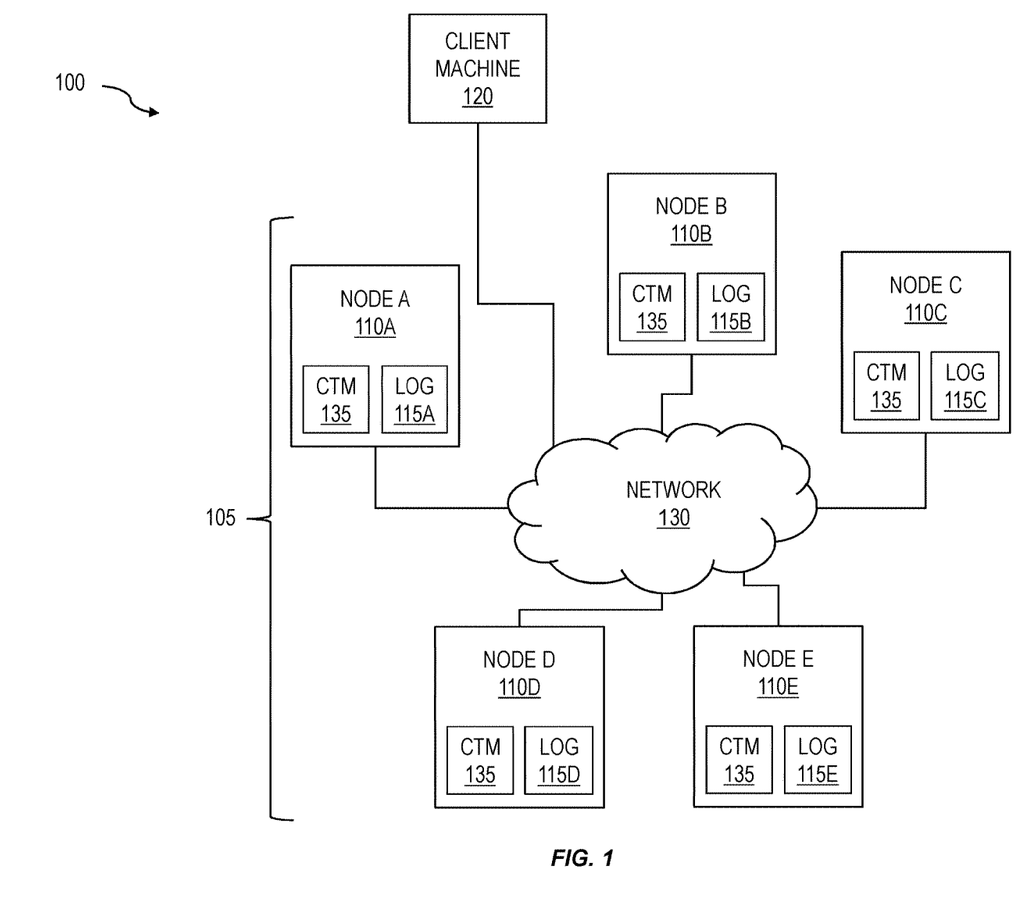
FIG. 1 shows a diagram illustrating features of a distributed computing system.
Figure 2:
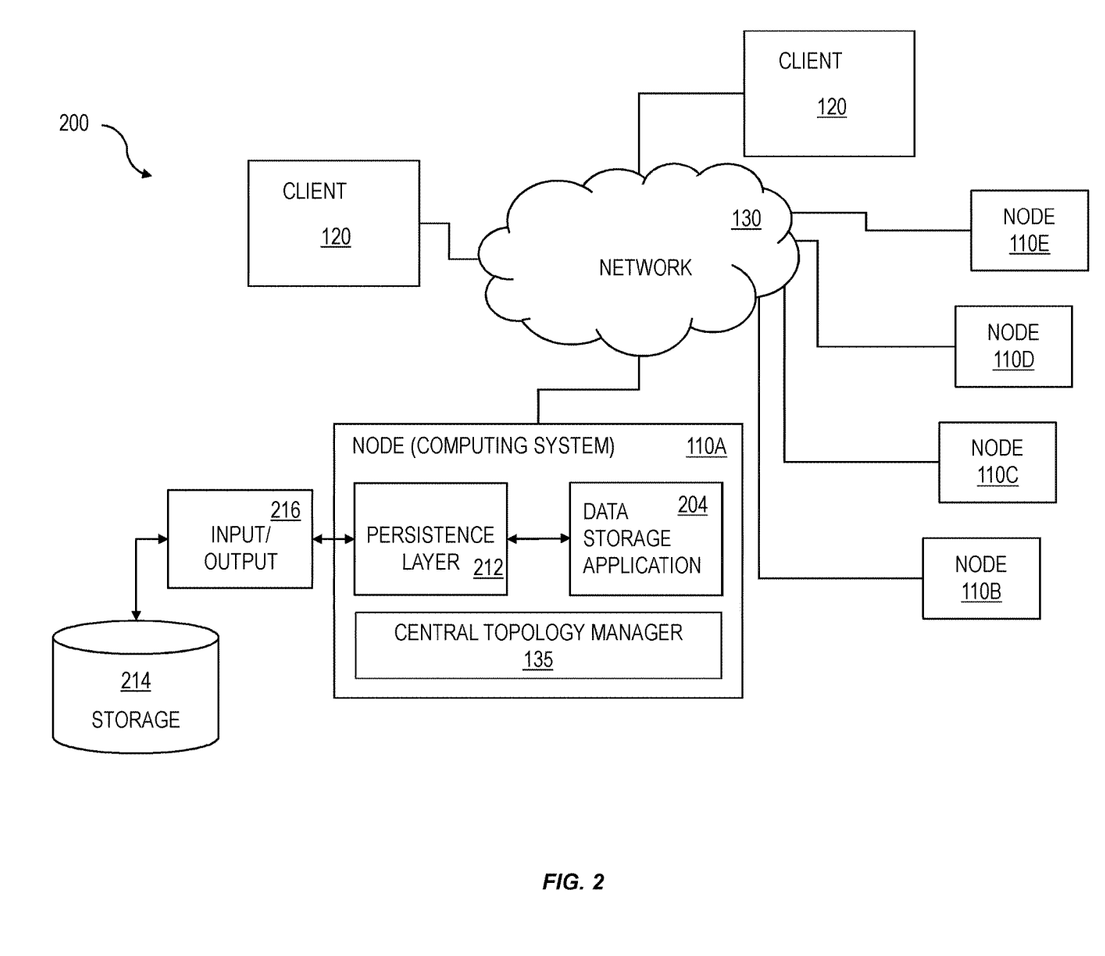
FIG. 2 shows a diagram illustrating aspects of a computing system arrangement having one or more features consistent with implementations of the current subject matter.

FIG. 1 shows a diagram of a distributed computing system architecture 100 featuring a cluster 105 of nodes 110A, 110B, 110C, 110D, 110E (e.g. computing systems) that communicate with each other and optionally with one or more client machines 120 over a network communication pathway 130. In one non-limiting example, the cluster 105 can implement a distributed data storage application, which can involve the nodes of the cluster 105 each implementing a state machine of the data storage application and being kept in a consistent state based on a consensus protocol exchanging messages among the nodes. It will be understood that reference herein to data storage applications and consensus protocols is not intended to be restrictive of the scope of the currently disclosed subject matter, but rather as an illustrative example of an environment in which the current subject matter can optionally be deployed.

Consensus protocols can ensure that data replicated across several nodes of a cluster of nodes remain in a consistent state and are widely used in distributed computing systems to achieve failure tolerance in clusters of computers. Each computing node in the cluster runs its own copy of a state machine. Consensus involves multiple nodes (e.g. servers, computing systems, data stores, etc.) being in agreement on data values. Once a consensus is reached, that decision is final. Consensus is typically reached when a quorum (e.g. a majority, a plurality, or some other definition etc.) of the nodes in the cluster decides to accept the new state of the system (e.g., adding new data to a database table, setting a value for a key in key value stores, accepting a message in messaging systems, etc.). The state of the state machine presented by the cluster is based on the consensus such that clients interacting with the cluster perceive the nodes as a single state machine having a consistent state. A consensus algorithm can ensure that if any of the state machines in a cluster applies a particular command at a particular point in a series of commands, none of the other state machines in the cluster will apply a different command at that same point in the series of commands. Well-known examples of consensus protocols include Paxos and RAFT. Co-owned and co-pending U.S. patent application Ser. No. 15/184,054, the disclosure of which is incorporated herein by reference, includes a description of a flexible durability approach for implementation on a distributed system with a write-ahead log. Allowing delayed or relaxed durability options for some date writing operations as described therein can allow more efficient handling of some date storage tasks. However, employing such relaxed durability options can increase the need for error recovery protocols in a distributed system.

In a distributed data storage application, as well as in other distributed applications, processes running on a given node may need to be replicated or at least communicated to peer nodes in a cluster 105. In the event of a node failure, a node restart, a network disruption, or any other loss of communication, etc. (all of which are generically referred to herein with terms such as "loss of communication," "loss of communication between a node and its peers," and similar phrasing), it is desirable to be able to quickly, efficiently, and without unnecessary duplication resume communication between a node and its peers at a latest point possible while ensuring that no messages being exchanged between processes running on the nodes are missed as a result of the loss of communication.

Consistent with implementations of the current subject matter, detection of a loss of communication in a distributed system, including but not limited to distributed data storage applications, can be delegated to a central topology manager instance (which need not be a single point of failure, but can itself be a distributed system). In FIG. 1, the central topology manager instance 135 is depicted as being implemented on all of the nodes 110A, 110B, 110C, 110D, 110E of the cluster 105. However, it will be understood that the central topology manager instance 135 could also be implemented on a single node of the cluster 105 and/or on one or more machines other than those in the cluster 105. This central topology manager instance 135 can provide information regarding whether or not a node in the cluster 105 is still reported alive or not. As long as a node is reported alive, a connection may be retried in the event of a detected loss of communication.

As noted above, when communication is reestablished, it can be necessary to identify whether the reestablished communication is with a same instance of the node as before the loss of communication and which (if any) pending messages intended for the node with which communication was lost should be re-sent. Typically, a network connection is terminated after timeout or due to network failure messages (such as in TCP/IP) and any pending messages are dropped. However, it can be desirable to continue communication at the point of the communication loss, if possible, to prevent expensive error-recovery procedures (which may also potentially lead to unnecessary aborts of end-user transactions).

In order to safely determine whether it is possible to continue communication after a loss of communication has occurred between a node and one or more of its peers and at which point in a message stream the communication should be continued, implementations of the current subject matter can provide a communication layer on top of a network protocol (e.g. TCP/IP, a RDMA channel, or the like) and can retain communication resumption information at communication endpoints (e.g. the nodes of a cluster 105) to enable resumption of communication without loss or unnecessary duplication. The communication resumption information retained at the communication endpoints (e.g. nodes) can include an invocation count of a process, a last message received index for each peer, and an invocation count of the peer process for each peer. The invocation count of the process can be incremented with each restart/crash recovery and persisted in a suitable way (e.g. storage on a computer-readable medium that is part of or otherwise accessible to the node. The last message received index for each peer as well as the invocation count of the peer process for each peer can optionally be transient information, which can therefore be retained in volatile memory. In an alternative implementation, any locally-unique number (e.g. a start time of a process or a GUID) can be used instead of an invocation count of the process.

When a communication connection is reestablished after a loss of communication, peers in a cluster 105 or other distributed stem architecture can exchange the above-mentioned communication resumption information first. If a given node's (e.g. a first peer's) process invocation count based on local knowledge of a last successful communication with the peer and the count sent from another peer differ, then it can be determined that the other peer was restarted (e.g. the loss of communication was caused by a system crash of the other peer, resumption of communication after the loss of communication involved restarting the other peer, the other peer was restarted during the period in which communication was not established, etc.). Any messages queued for this restarted other peer by one or more other nodes in the cluster must therefore be discarded and the senders of those messages notified about the peer restart such that error recovery can be initiated. If the process invocation counts are equal between local knowledge at a given node (e.g. a first peer) and the counts sent from another peer, the communication can be reestablished without losing messages. In this case, a last received message index sent from the other peer is checked at the node (first peer) and any messages sent by the node (first) peer) to this other peer and having an index lower or equal to the received message index but not yet confirmed by the other peer can be discarded under the assumption that they have been previously received by the peer before communication was lost. Afterwards, any messages still in the pending message queue (i.e. messages having an index greater than the last received message index) can be resent over the newly-reestablished connection.

Features of the current subject matter can provide one or more advantages. For example, while currently available consensus protocols such as Paxos and RAFT can provide mechanisms to detect failures and synchronize state machines, these approaches typically require a permanent network communication. TCP/IP mechanisms can provide protection for certain transient network failures as well. Implementations consistent with the current subject matter can address the issues of reestablishing communication on a higher level than the network protocol (such as TCP/IP or RDMA channel) based on information of liveness of nodes in a distributed system handled by a central topology manager. Such features can further enable impregnation of a heartbeat-less consensus protocol.

Figure 3:
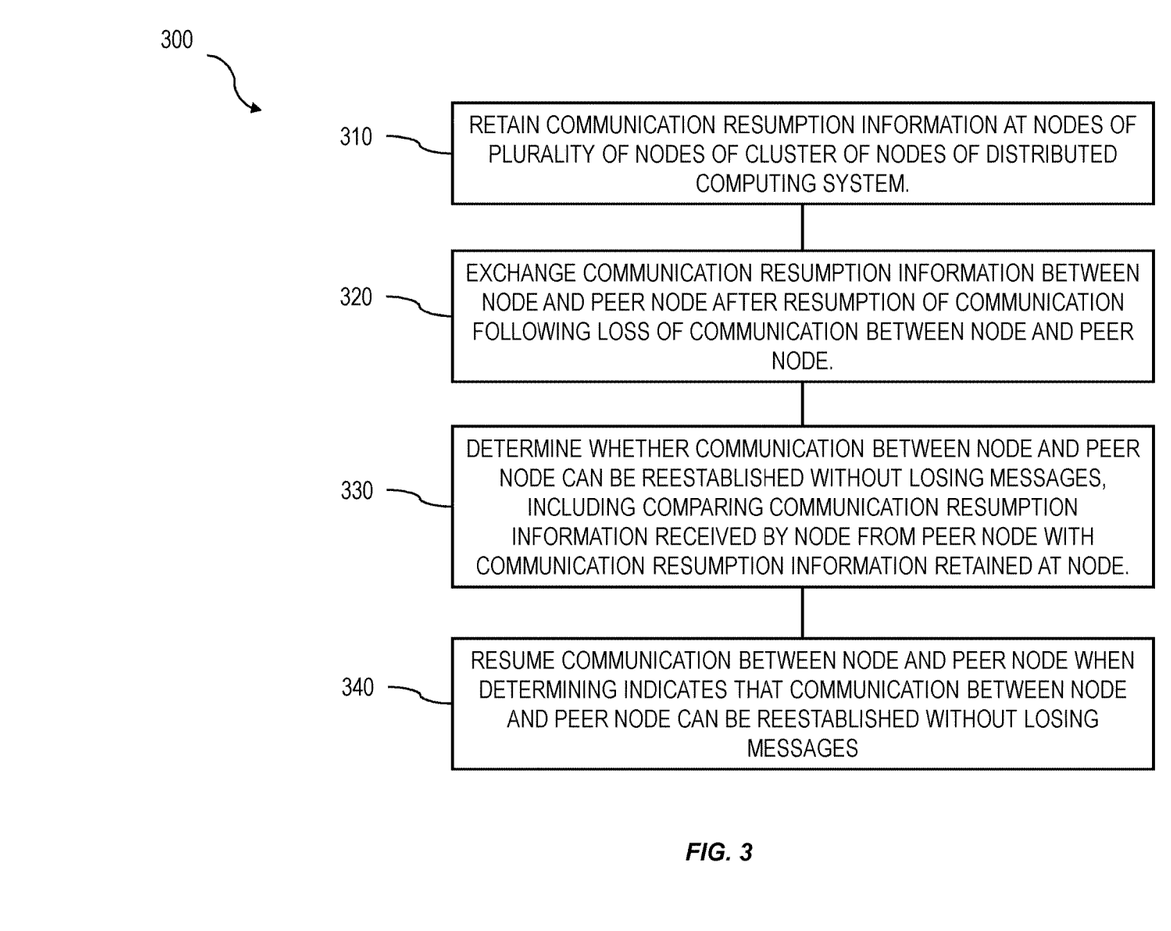
FIG. 3 shows a process flow diagram illustrating aspects of a method having one or more features consistent with implementations of a first aspect of the current subject matter.

FIG. 3 shows a process flow chart 300 illustrating features that can be included in a method consistent with implementations of the current subject matter. At 310, communication resumption information is retained at each of a plurality of nodes of a cluster of nodes that comprises a distributed computing system. The communication resumption information can include an invocation count of a process being run on the cluster, a last message received index for each peer node in the cluster, and an invocation count of the peer process for each peer node in the cluster. At 320, nodes in the cluster exchange the communication resumption information with one another after resumption of communication following a loss of communication. At 330, the communication resumption information received by a node of the cluster from a peer node of the cluster is compared with the communication resumption information retained at the node to determine whether communication between the node and the peer node can be reestablished without losing messages. At 340, communication between the node and the peer node is resumed when the determining indicates that communication between the node and the peer node can be reestablished without losing messages.

For example, as noted above, when the process invocation count kept locally at the node differs from the process invocation count received by the node from the peer node, the method includes determining that the peer node was restarted. Based on this determining, the action for resuming communication between the node and the peer node can include any messages queued by the node for peer node being discarded and an error recovery process is initiated for the discarded messages. When the process invocation counts are equal between local knowledge retained at the node and the invocation count sent from the peer node, the last received message index sent from the peer node is checked at the node and any messages sent by the node to the peer node and having an index lower or equal to the received message index but not yet confirmed by the peer node can be discarded under the assumption that they have been previously received by the peer before communication was lost. The resuming of communication can further include resending (from the node to the peer node) any messages still in a pending message queue at the node over the reestablished connection.

A further implementation of the current subject matter relates to a modified consensus protocol for eliminating heartbeat network traffic. As noted above, distributed computer systems typically rely upon some kind of consensus protocol (such as the Paxos family of protocols or RAFT or the like) to achieve data replication and consistency across the cluster. In conventional approaches, heartbeat messages and timeouts are typically used with these existing approaches to detect failed nodes. Such techniques can be sufficient for a relatively small number of nodes in a distributed system, but may create significant network traffic for a large system, especially one that includes many data partitions represented by smaller consensus islands within each respective partition. Additionally, for a large system that is partitioned into smaller data partitions that each use their own consensus protocol instances, the failure of one node of the system generally affects only that particular partition.

If all partitions in such a system are used approximately equally, consensus verification traffic generally does not result in an additional network load, since it is normally piggybacked on data replication traffic. However, for a system used to run very disparate workloads (e.g., a centrally-hosted multi-tenant system at a platform (such as, for example, the platform as a service products available from SAP SE of Walldorf, Germany and other vendors of multi-tenant, "in the cloud" platform offerings) with many micro-tenants, infrequently-used partitions may generate significant and recurring consensus traffic, which can be wasteful of resources. Accordingly, it can be desirable to have an alternative approach capable of achieving the same consistency and timing guarantees without traditional heartbeat messages.

Some implementations of the current subject matter can extend existing consensus protocols. Each data partition can be assumed to run its own copy of a modified consensus protocol over several state machine replicas (which can also be described as "followers" or "follower nodes". A central component, which as mentioned above and generally referred to herein as a central topology manager, can track the "liveness" of individual nodes of the system, and can be used to query node states if necessary. As discussed, an instance 135 of this central topology manager can itself be a distributed system (i.e., no single point of failure) as described above in reference to FIG. 1. Further, a higher-level connection management protocol can check connection status at low-level reconnects, for example as described above.

Consistent with this aspect of the current subject matter, instead of using fire-and-forget messages between nodes in the nodes synchronized by a consensus protocol instance (e.g. as in existing heartbeat or timeout-based approaches), at least semi-reliable delivery of messages by the higher-level connection management protocol is assumed. In this manner, heartbeat timeouts typically used in RAFT or other consensus protocols are not necessary.

Election (e.g. using an election timeout and fire-and-forget messages) can be used initially to elect the master node (also referred to as a leader node) for a data partition. While it will be understood that the current subject matter may operate with other consensus protocols, various features are described herein in relation to the RAFT protocol. In establishing consensus between multiple nodes in a cluster (e.g. a cluster 100 such as that shown in FIG. 1) the RAFT protocol general involves transmission of a "match index" from follower nodes 110B, 110C, 110D, 110E to a leader node 110A to inform the leader node 110A what is the last common log entry index in the local log 115B, 115C, 115D, 115E of each follower node 110B, 110C, 110D, 110E and the log 115A of the leader node 110A. The RAFT protocol further includes transmission of a "commit index" from the current leader 110A to all of the follower nodes 110B, 110C, 110D, 110E to inform the follower nodes what is the globally agreed index of the last fully-replicated log entry.

Further to the above summary, the RAFT protocol classifies each node in a cluster 100 as being in one of a follower state (e.g. a replica node), a candidate state, or a leader state (e.g. a state in which a master node operates). All nodes in a cluster other than the leader or master node have the follower state and can be referred to as replica nodes. However, when a current replica node fails to hear from a leader node of the cluster within some period of time, the follower node can become a candidate node and request votes from other nodes in the cluster as part of a leader election process. The candidate node becomes the leader node 110A if it receives a majority of the votes from the nodes in the cluster 105.

Consistent with implementations of the current subject matter, after election of a leader node, all nodes generally assume semi-reliable communication for the time being and stop election timeouts. The master node can replicate data to follower nodes in a manner similar to that used in the RAFT protocol, but need not set retry timeouts. Instead, an underlying communication layer can be responsible for checking the state of the network and liveness of the node, if necessary, via an instance of the central topology manager 135. In particular, when communication loss is detected by this layer on any of the follower nodes in the cluster 105, a new master election is attempted starting from this follower node, which may result either in election of a new master node or reconnecting of the failed node to the existing master.

In case of transient communication errors between a master node and a replica node, the low-level communication protocol (e.g., a protocol like TCP/IP) is assumed to handle any necessary retransmissions by itself. For communication loss exceeding some threshold amount of time (which can optionally be set equal to the heartbeat interval of the standard RAFT protocol), the central topology manager 135 can be queried about liveness of the node via a higher-level protocol consistent with the current subject matter and can react accordingly (e.g. by retrying the communication, ceasing the communication from the master to replica, or starting a new master election on a replica). This approach can ensure similar timing as if traditional heartbeat messages were used to confirm "liveness" of nodes in a cluster.

A similar approach can be also be leveraged for communication from a client 120 to the cluster 105 (which is not addressed by consensus protocols and generally requires a different solution when using previously available approaches). By default, a client 120 connects to the current master node 110A of the cluster 105. When the client 120 detects an absence of communication from the cluster 105 for some time (e.g., a reply from the master node 110A does not arrive at the client 120 within an expected timeout period), the client 120 can query the central topology manager instance 135 regarding liveness of the master node 110A and possibly retry communication with a new master node, (e.g. if a new master node was elected in the meantime), or let a replica node begin a master election process and then retry with the new master.

Figure 4:
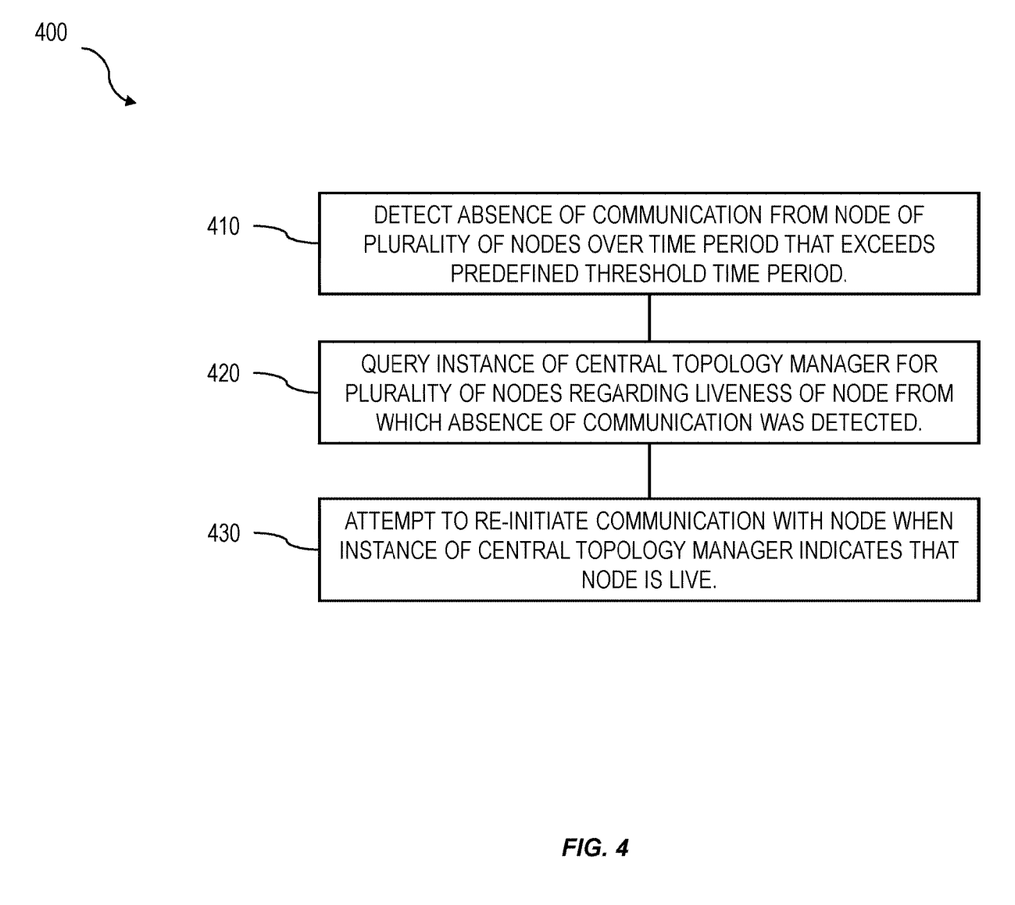
FIG. 4 shows a process flow diagram illustrating aspects of a method having one or more features consistent with implementations of a second aspect of the current subject matter.

FIG. 4 shows a process flow chart 400 illustrating features that may be included in a methods consistent with implementations of the current subject matter. At 410, a computing system in data communication with a plurality of nodes that make up a distributed computing cluster detects an absence of communication from a node of the plurality of nodes over a time period that exceeds a predefined threshold time period. At 420, the computing system queries an instance of a central topology manager for the plurality of nodes regarding liveness of the node from which the absence of communication was detected. At 430, the computing system attempts to re-initiate communication with the node when the instance of the central topology manager indicates that the node is live. The re-initiating can include one or more of retrying a failed communication with the node, ceasing the communication from the master node of the cluster to a follower node of the cluster, and starting a new master election process on a follower node of the plurality of nodes. As noted above, the computing system in this approach can be a second node of the plurality of nodes or a client machine (or other computing system external to the plurality of nodes).

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A computer-implemented method, comprising:
    detecting, by a computing system in data communication with a plurality of nodes comprising a distributed computing cluster implementing a consensus protocol, an absence of communication from a master node of the plurality of nodes over a time period that exceeds a predefined threshold time period, the absence of communication comprising the master node failing to respond to the computing system within a threshold quantity of time;
    querying, by the computing system, a central topology manager tracking a liveness of each of the plurality of nodes comprising the distributed computing cluster, the central topology manager being queried to determine a liveness of the master node from which the absence of communication was detected; and
    in response to the central topology manager indicating that the master node is live, attempting, by the computing system, to re-initiate communication with the master node.

2. A computer-implemented method as in claim 1, wherein the computing system comprises another node of the plurality of nodes.

3. A computer-implemented method as in claim 1, wherein the computing system comprises a client machine in communication with the distributed computing cluster.

4. A computer-implemented method as in claim 1, wherein the re-initiating comprises retrying a failed communication with the master node.

5. A computer-implemented method as in claim 1, wherein the re-initiating comprises ceasing the communication from the master node of the distributed computing cluster to a follower node of the distributed computing cluster.

6. A computer-implemented method as in claim 1, wherein the re-initiating comprises starting a new master election process on a follower node of the plurality of nodes.

7. A computer program product comprising a non-transitory machine-readable medium storing instructions that, when executed by at least one programmable processor, cause operations comprising:
    detecting, by a computing system in data communication with a plurality of nodes comprising a distributed computing cluster implementing a consensus protocol, an absence of communication from a master node of the plurality of nodes over a time period that exceeds a predefined threshold time period, the absence of communication comprising the master node failing to respond to the computing system within a threshold quantity of time;
    querying, by the computing system, a central topology manager tracking a liveness of each of the plurality of nodes comprising the distributed computing cluster, the central topology manager being queried to determine a liveness of the master node from which the absence of communication was detected; and in response to the central topology manager indicating that the master node is live, attempting, by the computing system, to re-initiate communication with the master node.

8. A computer program product as in claim 7, wherein the computing system comprises another node of the plurality of nodes.

9. A computer program product as in claim 7, wherein the computing system comprises a client machine in communication with the distributed computing cluster.

10. A computer program product as in claim 7, wherein the re-initiating comprises retrying a failed communication with the master node.

11. A computer program product as in claim 7, wherein the re-initiating comprises ceasing the communication from the master node of the distributed computing cluster to a follower node of the distributed computing cluster.

12. A computer program product as in claim 7, wherein the re-initiating comprises starting a new master election process on a follower node of the plurality of nodes.

13. A system, comprising:
at least one data processor; and
at least one memory storing instructions, which when executed by the at least one data processor, cause operations comprising:
detecting, by a computing system in data communication with a plurality of nodes comprising a distributed computing cluster implementing a consensus protocol, an absence of communication from a master node of the plurality of nodes over a time period that exceeds a predefined threshold time period, the absence of communication comprising the master node failing to respond to the computing system within a threshold quantity of time;
querying, by the computing system, a central topology manager tracking a liveness of each of the plurality of nodes comprising the distributed computing cluster, the central topology manager being queried to determine a liveness of the master node from which the absence of communication was detected; and
in response to the central topology manager indicating that the master node is live, attempting, by the computing system, to re-initiate communication with the master node.

14. A system as in claim 13, wherein the computing system comprises another node of the plurality of nodes.

15. A system as in claim 13, wherein the computing system comprises a client machine in communication with the distributed computing cluster.

16. A system as in claim 13, wherein the re-initiating comprises retrying a failed communication with the master node.

17. A system as in claim 13, wherein the re-initiating comprises ceasing the communication from the master node of the distributed computing cluster to a follower node of the distributed computing cluster.

18. A system as in claim 13, wherein the re-initiating comprises starting a new master election process on a follower node of the plurality of nodes.

* * * * *